(12) United States Patent
Blessing

(10) Patent No.: US 10,767,796 B2
(45) Date of Patent: Sep. 8, 2020

(54) SANITARY SHOWER

(71) Applicant: Hansgrohe SE, Schiltach (DE)

(72) Inventor: Gerd Blessing, VS-Obereschach (DE)

(73) Assignee: Hansgrohe SE, Schiltach (DE)

( * ) Notice: Subject to any disclaimer, the term of this patent is extended or adjusted under 35 U.S.C. 154(b) by 453 days.

(21) Appl. No.: 14/832,396

(22) Filed: Aug. 21, 2015

(65) Prior Publication Data

US 2016/0061369 A1 Mar. 3, 2016

(30) Foreign Application Priority Data

Aug. 26, 2014 (DE) .......................... 10 2014 216 975

(51) Int. Cl.
| | | |
|---|---|---|
| *F16L 37/08* | (2006.01) | |
| *B05B 15/65* | (2018.01) | |
| *B05B 1/18* | (2006.01) | |
| *E03C 1/04* | (2006.01) | |
| *F16L 37/098* | (2006.01) | |

(52) U.S. Cl.
CPC ................ *F16L 37/08* (2013.01); *B05B 1/18* (2013.01); *B05B 15/65* (2018.02); *E03C 1/0408* (2013.01); *F16L 37/0987* (2013.01)

(58) Field of Classification Search
CPC .... F16L 37/08; F16L 37/0987; B05B 15/065; E03C 1/0408
USPC ............................................................ 4/596
See application file for complete search history.

(56) References Cited

U.S. PATENT DOCUMENTS

| | | | | |
|---|---|---|---|---|
| 2,449,920 A | * | 9/1948 | Williams .............. | E03C 1/0404 285/305 |
| 4,863,201 A | * | 9/1989 | Carstens .................. | F16L 37/42 251/149.6 |
| 6,001,250 A | * | 12/1999 | Schorn ................. | B01D 29/114 210/235 |
| 7,021,669 B1 | * | 4/2006 | Lindermeir ............. | F16L 37/12 285/317 |
| 8,366,154 B2 | * | 2/2013 | Wang ..................... | F16L 37/133 285/314 |
| 2004/0217196 A1 | * | 11/2004 | Yurek, Jr. ............... | E03C 1/021 239/289 |
| 2006/0170210 A1 | | 8/2006 | Gross | |

(Continued)

FOREIGN PATENT DOCUMENTS

| | | |
|---|---|---|
| DE | 1991493 U | 5/1968 |
| DE | 10141296 B4 | 12/2004 |

(Continued)

OTHER PUBLICATIONS

Search Report dated Jan. 21, 2016 in EPO application No. 15 18 1658.
Official action dated Mar. 10, 2015 in DE 10 2014 216 975.5.

*Primary Examiner* — Janie M Loeppke
(74) *Attorney, Agent, or Firm* — Duane Morris LLP

(57) ABSTRACT

A sanitary shower useful as an overhead shower has a shower body including a fluid inlet and a fluid outlet, and a shower head that is removably attachable to the shower body, has a fluid inlet connecting with the fluid outlet of the shower body and includes a shower outlet providing a shower fluid jet. A plug-on connector removably attaches the shower head to the shower body via latching lugs that snap radially into engagement with latching holes and are blocked and unblocked from disengagement by a movable locking ring.

12 Claims, 4 Drawing Sheets

(56) References Cited

U.S. PATENT DOCUMENTS

Figure 1:
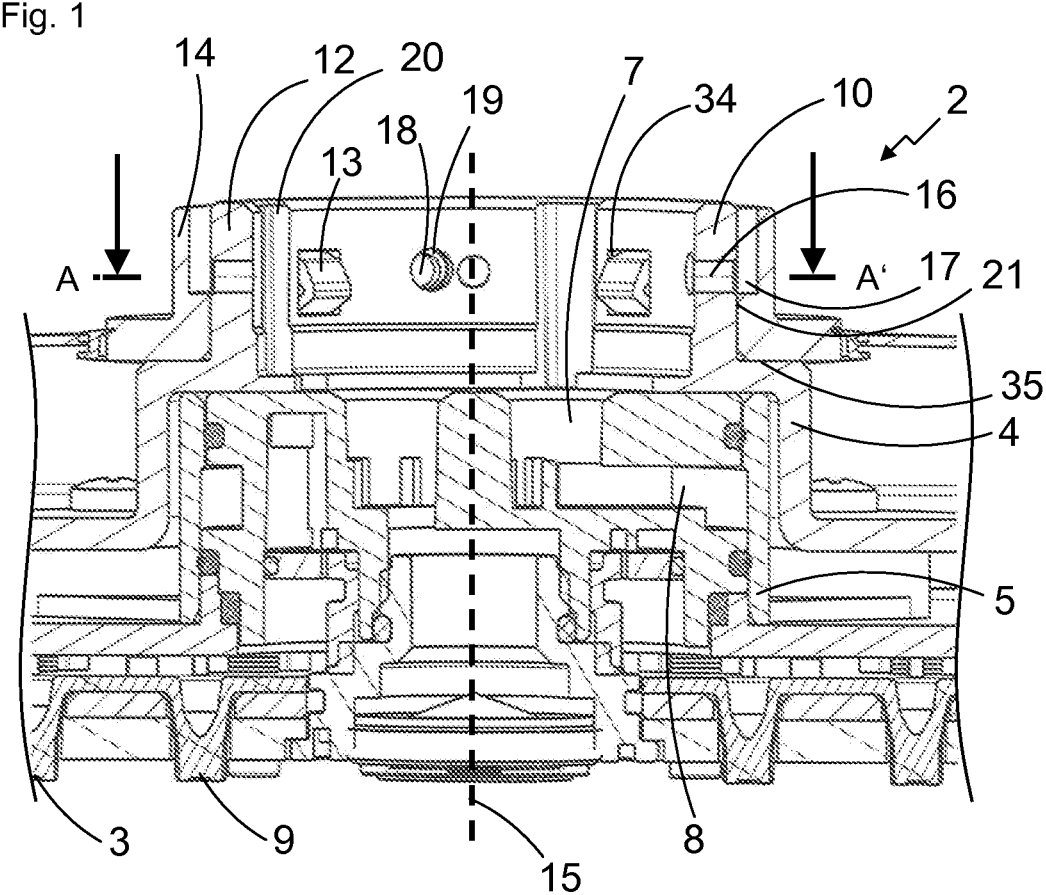

2011/0006514 A1 1/2011 Li et al.
2012/0266376 A1 10/2012 Marty et al.
2013/0341905 A1* 12/2013 Lehmann ................ F16L 37/22
　　　　　　　　　　　　　　　　　　　　　　285/33

FOREIGN PATENT DOCUMENTS

DE　　102005001301 A1　　7/2006
DE　　102005002426 A1　　7/2006

* cited by examiner

SANITARY SHOWER

The invention relates to a sanitary shower, in particular an overhead shower, comprising a shower body including a fluid inlet and a fluid outlet, and a shower head which is removably attachable to the shower body with a fluid inlet in connection with the fluid outlet of the shower body and includes a shower outlet for providing a shower fluid jet. The sanitary shower with the shower outlet can be, for example, a shower head fitting.

The shower body and the shower head of the sanitary shower are conventionally formed, for example, as a single part, or the two components frequently have to be connected by means of a screw connection as a one-off connection. However, overhead installation of such a sanitary shower on a shower cubicle ceiling or bathroom ceiling, in particular the possible screwing of the shower head to the shower body overhead, is relatively arduous.

For the rapid connection of sanitary showers in various positions, for example in the case of side showers and overhead showers, the prior art has already proposed various bayonet catches which can be fitted by inserting the respective component into a receptacle and can be locked by rotating the component in the receptacle, wherein, in the case of this generally known locking mechanism, projections are brought into engagement with grooves corresponding thereto. Bayonet catches of this type are revealed, for example, in DE 101 41 296 B4 or else in DE 10 2005 001 301 A1. Depending on the design, there is the problem, in the case of these known bayonet catches, that the latter are difficult to release if the bayonet mechanism is designed so as to snap in securely for safety reasons, or that, when designed for easy release, there is the risk of the connection being released by itself.

The technical problem on which the invention is based is the provision of a sanitary shower of the type mentioned at the beginning which permits a user-friendly and at the same time secure installation of the shower head on the shower body.

The invention solves this problem by the provision of a sanitary shower with the features of claim 1. In the case of the sanitary shower according to the invention, plug-on connector means for removably attaching the shower head to the shower body are provided.

The sanitary shower according to the invention makes it possible in an advantageous manner to connect the shower head to the shower body simply by plugging the two components together, i.e. a form-fitting connection between the shower head and the shower body, which connection is formed by plugging the two together, is provided. This makes it advantageously possible first of all to install the shower body on a shower cubicle ceiling or bathroom ceiling and subsequently to plug the shower head onto the shower body in a simple, tool-free and rapid manner. The shower head and the shower body are mechanically connected here, and the fluid outlet of the shower body and the fluid inlet of the shower head are connected fluidically here. Connected fluidically means that a fluid flow between two parts, in the present case between the fluid outlet of the shower body and the fluid inlet of the shower head, is possible. In particular, a large shower head with a shower outlet in the form of a multiplicity of jet outlet openings in a jet disc can have a correspondingly high weight. In an advantageous manner, in the event of overhead installation, the shower head does not have to be held for a long time by the installer and at the same time screwed on, but merely has to be lifted and plugged on. When the shower head is connected to the shower body, the shower head can no longer be released by itself from the shower body. The plug-on connector means can be released by the installer, for example for cleaning or repair purposes, and therefore the shower head can easily be removed from the shower body and can be refitted after cleaning or repair. In the present case, a part of the shower head that has at least one part of the plug-on connector means is also referred to as connection part, and a remaining part of the shower as shower part.

The fluid inlet of the shower body can serve for the connection, for example, to a water supply line of a mixing and/or changeover valve. A shower head can comprise a plurality of shower outlets in the form of groups of jet outlet openings in a jet disc, wherein the shower outlets can be supplied separately from one another with water in order to produce different shower jet patterns.

In particular in the case of an overhead shower, a wall element can be provided on a lateral wall, for example of a shower cubicle, by means of which the shower outlets can be activated separately from one another. A plurality of fluid lines corresponding to the plurality of shower outlets can lead here from the wall element to the sanitary shower. In a manner corresponding to the plurality of shower outlets of the shower head, the shower head can advantageously comprise a plurality of fluid inlets, and the shower body can advantageously comprise a plurality of fluid inlets and fluid outlets, wherein the fluid outlets of the shower body correspond in the fitted state with the fluid inlets of the shower head.

In a development of the invention, the plug-on connector means have at least one latching lug and a corresponding latching hole in which the latching lug is lockable by latching on, i.e. a form-fitting connection formed by latching is realized between the shower head and the shower body. When the shower head and the shower body are plugged together, the at least one latching lug latches into the corresponding latching hole, i.e. the latching lug is deformed elastically and subsequently hooks in the latching hole. For this purpose, the at least one latching lug is suitably manufactured from a material having elastic properties, such as, for example, an elastic metal material or plastics material. The shower head can therefore be secured in an advantageous manner in an axial direction against release from the shower body. The plug-on connector means can advantageously have a stop limitation which can limit the plugging together of the shower head and of the shower body in the axial plugging-together direction, as a result of which the latching connection in this case needs to secure the shower head only in the opposite direction.

In a refinement of the invention, the plug-on connector means include a first coupling ring part on the shower body and a second coupling ring part on the shower head, which second coupling ring part is removably connectable to the first coupling ring part by coaxial insertion, wherein on one coupling ring part the latching hole is provided and on the other coupling ring part the latching lug is disposed to be snappingly movable in the radial direction. Advantageously, in the connected state, the second coupling ring part can at least partially surround the first coupling ring part or the first coupling ring part can at least partially surround the second coupling ring part, as a result of which there can be a form-fitting connection between the first coupling ring part and the second coupling ring part in the radial direction perpendicular to the axial direction. The one coupling ring part can be the first or the second coupling ring part, and the other coupling ring part can be correspondingly the second or the first coupling ring part. When the shower head and the shower body are plugged together, the latching lug disposed to be snappingly movable in the radial direction latches in the latching hole, i.e. the latching lug latches from radially on the inside to radially on the outside or from radially on the outside to radially on the inside into the latching hole opposite thereto.

In a refinement of the invention, the plug-on connector means include a locking ring which is disposed coaxially in relation to the coupling ring part including the latching lug and rotatable relative thereto, wherein the locking ring in a blocking position secures against removing of the latching lug from the latching hole and in an enable position, twisted relative to the blocking position, enables removing of the latching lug from the latching hole. The locking ring permits particularly simple release of the plug-on connection. The locking ring can advantageously be arranged on the coupling ring part including the latching lug in such a manner that an installer can easily twist the locking ring. The plug-on connector means can advantageously comprise a spring which can act upon the rotatable locking ring in the direction of the locking position.

In a refinement of the invention, the plug-on connector means include an anti-twist locking element by means of which the locking ring is fixable in the blocking position and secured against rotation. Unintentional rotation of the locking ring out of the blocking position into the enable position can therefore be avoided. The anti-twist locking element can advantageously be a screw which can be held in the locking ring and, in the blocking position of the locking ring, can be screwed into a screw opening which is oriented radially with respect thereto and which can be provided in the coupling ring part including the latching lug.

In a refinement of the invention, the locking ring has a recess on a side facing the latching lug into which recess the latching lug is movable for removing from the latching hole, when the locking ring is in the enable position, and which recess is displaced in relation to the latching lug in the circumferential direction, when the locking ring is in the blocking position. The latching lug and/or the latching hole can advantageously be shaped in such a manner that, when the shower head is released from the shower body, the latching lug can move in the radial direction into the recess when the locking ring is in the enable position.

In a refinement of the invention, the plug-on connector means include a locking ring which is disposed coaxially in relation to the coupling ring part including the latching lug and axially movable relative thereto, wherein the locking ring in a blocking position secures against removing the latching lug from the latching hole and in an enable position, axially displaced relative to the blocking position, enables removal of the latching lug from the latching hole. In addition, the locking ring can be disposed rotatably in relation to the coupling ring part including the latching lug, wherein the locking ring in a blocking position can secure against removal of the latching lug from the latching hole and in an enable position, rotated relative to the blocking position, can enable removing of the latching lug from the latching hole. The locking ring permits particularly simple release of the plug-on connection. The locking ring can advantageously be disposed on the coupling ring part including the latching lug in such a manner that an installer can easily bring about an axial displacement of the locking ring. The plug-on connector means can advantageously comprise a spring which can act on the axially movable locking ring in the direction of the blocking position.

In a refinement of the invention, the plug-on connector means include an axial locking element by means of which the locking ring is fixable in the blocking position and secured against axial displacement. Unintentional displacement of the locking ring out of the blocking position into the enable position can therefore be avoided. The axial locking element can advantageously be a screw which can be held in the locking ring and, in the blocking position of the locking ring, can be screwed into a screw opening which is oriented axially with respect thereto and can be provided in the coupling ring part including the latching lug.

In a refinement of the invention, the locking ring has a recess on a side facing the latching lug into which recess the latching lug is movable for removing from the latching hole, when the locking ring is in the enable position, and which recess is displaced in relation to the latching lug in the axial direction, when the locking ring is in the blocking position. The latching lug and/or the latching hole can advantageously be shaped in such a manner that, when the shower head is released from the shower body, the latching lug can be moved in the radial direction into the recess when the locking ring is in the enable position.

In a refinement of the invention, the one coupling ring part is provided with at least one axially extending guiding ridge and the other coupling ring part is provided with at least one axially extending guiding groove interacting with the guiding ridge. This permits an orientation of the shower head in relation to the shower body in a direction of rotation about a longitudinal axis of the coupling ring part of the shower head during installation and ensures that said orientation is maintained during operation.

Figure 2:
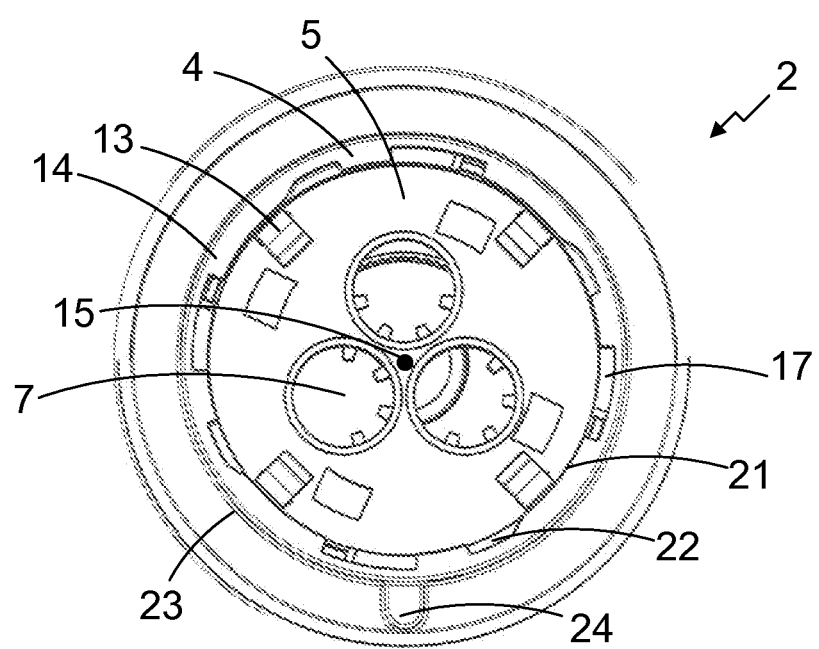
Figure 3:
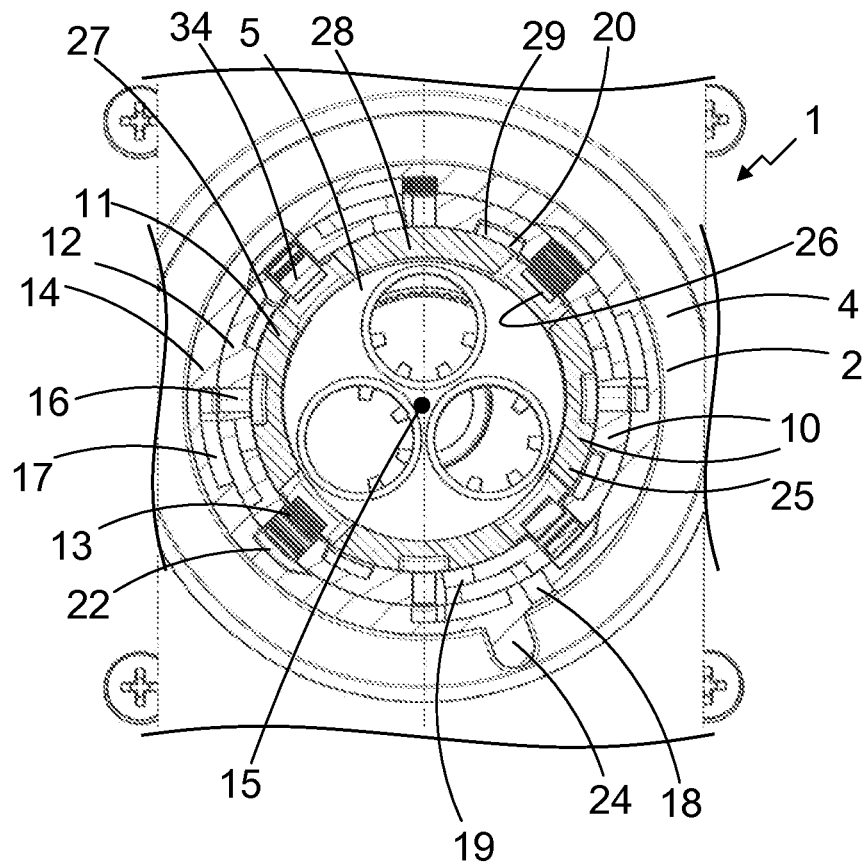
Figure 4:
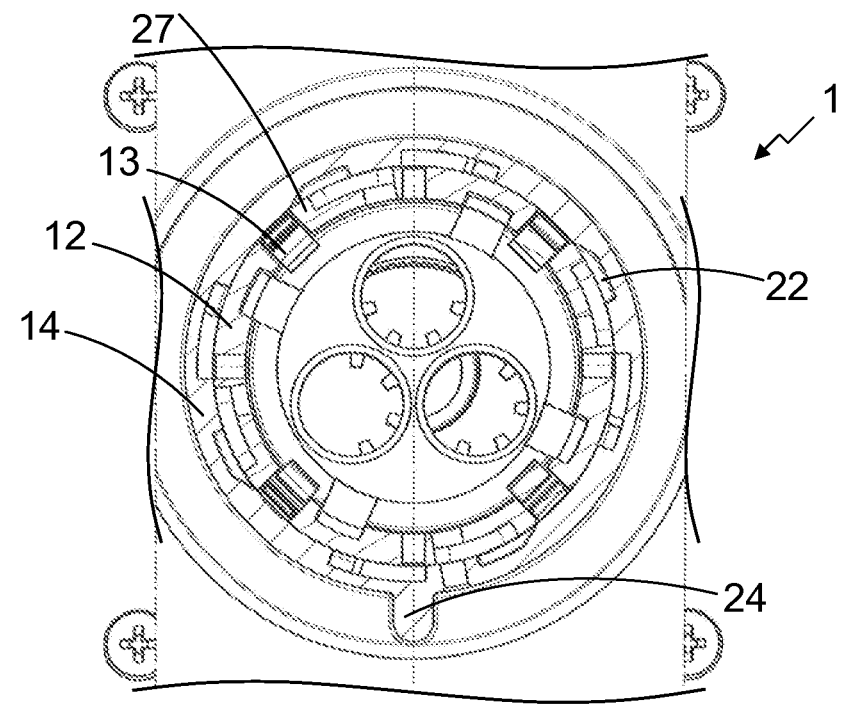
Figure 5:
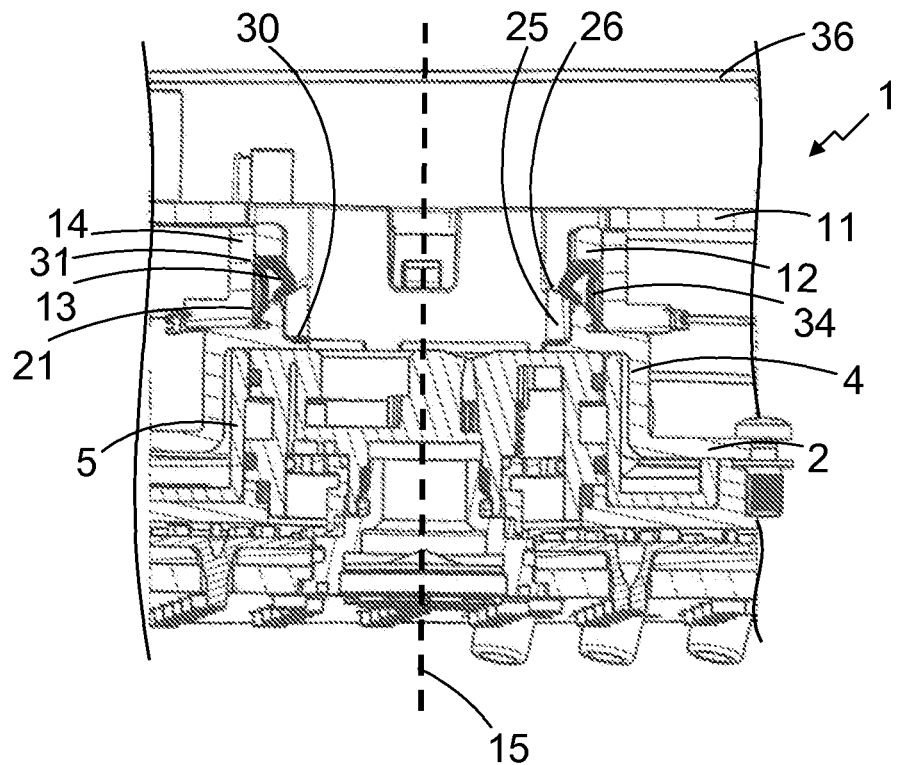
Figure 6:
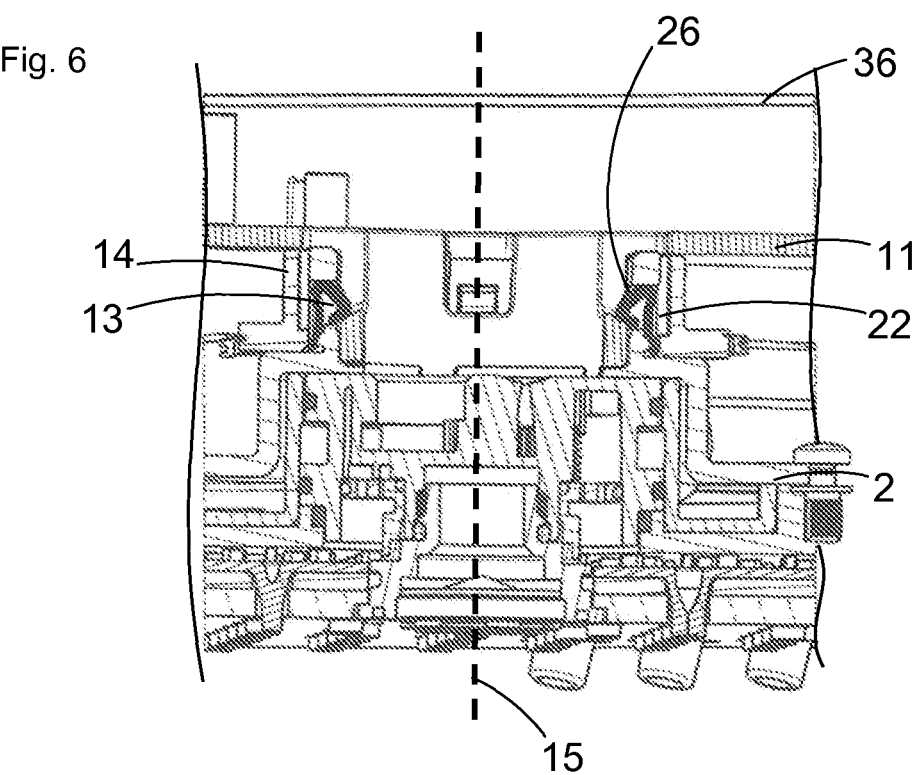
Figure 7:
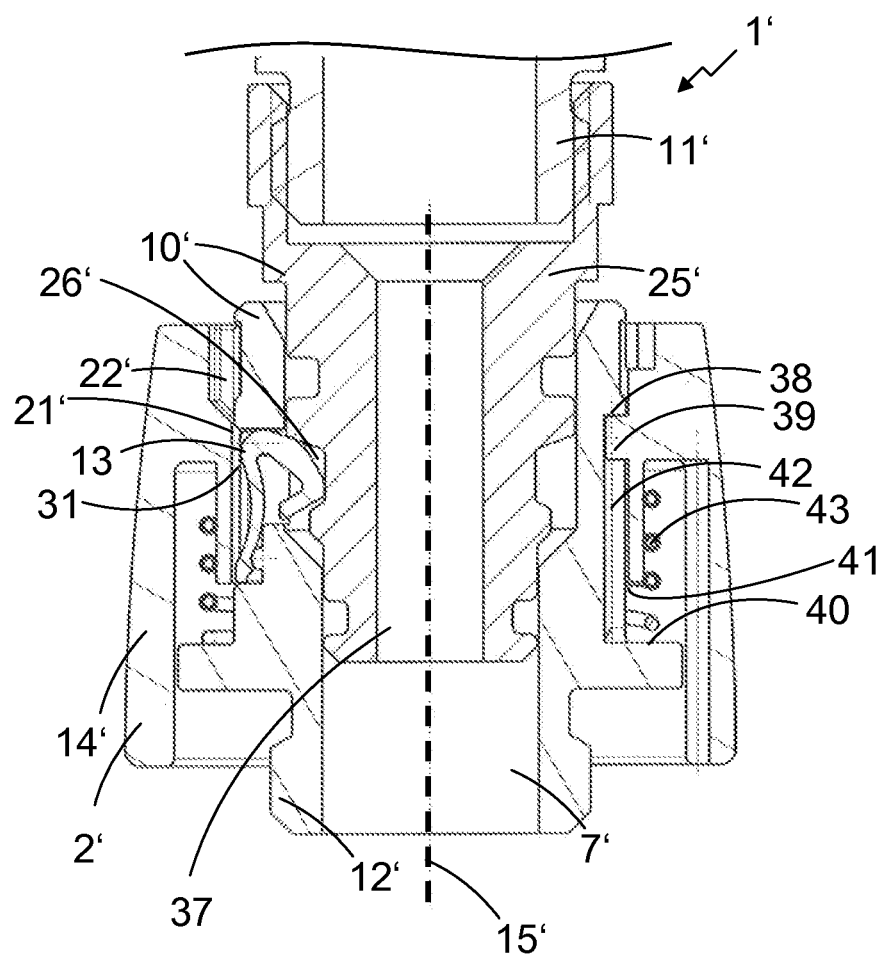

Advantageous embodiments of the invention are illustrated in the drawings and are described below. In the drawings:

FIG. 1 shows a longitudinal sectional view of a shower head with a connection part and a shower part, FIG. 2 shows a partial top view of the shower head from FIG. 1 with a locking ring, FIG. 3 shows a partial cross-sectional view of a sanitary shower with a shower body with a first coupling ring part and with the shower head from FIG. 1 with a second coupling ring part and the locking ring in an enable position, FIG. 4 shows a cross-sectional view corresponding to FIG. 3 with the locking ring in the blocking position, FIG. 5 shows a longitudinal sectional view of the sanitary shower from FIG. 3 with the locking ring in the blocking position, FIG. 6 shows a longitudinal sectional view corresponding to FIG. 4 with the locking ring in the enable position, and FIG. 7 shows a longitudinal sectional view of a further sanitary shower.

A shower head 2, shown in FIG. 1, of a sanitary shower with a jet disc 3 is suitable, for example, as a shower head fitting. The shower head 2 comprises a connection part 4 and a shower part 5, which are generally already connected to each other at the factory, preferably by means of screws. The shower part 5 has three fluid inlets 7 which are each fluidically connected via channels 8 to three shower outlets 9 in the form of three groups of jet outlet openings in the jet disc 3. The shower outlets 9 can therefore be supplied with fluid separately from one another.

The connection part 4 is part of plug-on connecting means 10 for removably attaching the shower head 2 to a shower body, not shown in FIG. 1, of the sanitary shower. The connection part 4 comprises a circular coupling ring part 12 on or in which four latching lugs 13 are disposed in four recesses 34. Furthermore, the connection part 4 comprises a circular locking ring 14 which is disposed coaxially in relation to the coupling ring part 12 and rotatable relative thereto, wherein the locking ring surrounds the latter and is therefore connected to said coupling ring part 12 in the radial direction perpendicular to a longitudinal axis 15 thereof. Axially along the longitudinal axis 15, the locking ring 14 is secured in relation to the coupling ring part 12 by bearing against a step 35 of the connection part 4 and by four retaining pins (not shown in FIG. 1). For this purpose, four retaining pin openings 16 are provided in the coupling ring part 12 and four retaining pin recesses 17 are provided for the retaining pins in the locking ring 14 on an inner side 21 facing the coupling ring part 12, into which retaining pin recesses the retaining pins can be completely pushed.

The locking ring 14, in the blocking position thereof shown in FIG. 1, can be fixed in a manner secured against rotation by an anti-twist locking element of the plug-on connector means 10 in the form of a screw, not shown in FIG. 1, wherein the screw is held in a screw thread 18 of the locking ring 14 and can be screwed radially from the outside into a screw opening 19 of the coupling ring part 12, which screw opening is correspondingly oriented radially in relation to the screw thread 18. An unintentional rotation of the locking ring 14 out of the blocking position into an enable position is therefore avoided. Furthermore, the coupling ring part 12 is provided with four axially extending guiding grooves 20.

FIG. 2 shows a partial top view of the shower head 2, wherein the coupling ring part 12 is not shown. The three fluid inlets 7 of the shower head 2 are arranged about the longitudinal axis 15 and lead parallel to the latter into the shower part 5. Furthermore, the four latching lugs 13, which are in each case disposed displaced by 90° with respect to one another about the longitudinal axis 15, and the locking ring 14 of the connection part 4 can be seen. In addition to the four retaining pin recesses 17, which are in each case disposed in the locking ring 14 displaced by 90° with respect to one another about the longitudinal axis 15, the locking ring 14, on the inner side 21 facing the latching lugs 13, has four recesses 22, which are each disposed displaced by 90° with respect to one another about the longitudinal axis 15, and an operating lug 24 on an outer side 23 which is radially opposite the inner side 21. If the locking ring 14 is not fixed in a manner secured against rotation in the blocking position, a user can use the operating lug 24 to bring about a rotation of the locking ring 14 about the longitudinal axis 15 in relation to the second coupling ring part 12, wherein a rotation of the locking ring 14 is limited to a limited angular range by the interaction of the retaining pins, not shown in FIG. 2, and of the retaining pin recesses 17.

FIG. 3 shows a partial cross-sectional view of the sanitary shower 1 in the fitted state with the shower body 11 and the shower head 2 along an intersecting line A-A' of the shower head 2 in FIG. 1. The shower head 2 is releasably attached to the shower body 11 by means of the plug-on connector means 10. In addition to the connection part 4 on the shower head 2, in particular the coupling ring part 12 with the latching lugs 13, the plug-on connector means 10 comprise a circular coupling ring part 25 on the shower body 11, wherein said coupling ring part and the coupling ring part 12 are plugged together coaxially by the coupling ring part 12 surrounding the coupling ring part 25 and therefore being connected in a form-fitting manner thereto in the radial direction. On the coupling ring part 25 there are four latching holes 26 which are each disposed displaced by 90° with respect to one another about the longitudinal axis 15.

When the shower head 2 and the shower body 11 are plugged together, the latching lugs 13, which are disposed in the latching lug recesses 34 to be snappably movable inwards in the radial direction with respect to the longitudinal axis 15, are locked in the corresponding latching holes 26, which are radially opposite thereto, by latching on. By means of the uniformly distributed arrangement of the latching lugs 13 over a circumference of the coupling ring part 12 and by means of the uniformly distributed arrangement of the latching holes 26 over a circumference 28 of the coupling ring part 25, holding forces are distributed uniformly over the circumferences 27, 28 of said coupling ring parts.

Furthermore, the coupling ring part 25 is provided with four axially extending guiding ridges 29 which are each disposed displaced by 90° with respect to one another about the longitudinal axis 15 and in which the four guiding grooves 20 of the second coupling ring part 12 engage, wherein the four guiding grooves 20 of the second coupling ring part 12 are likewise disposed displaced by 90° with respect to one another about the longitudinal axis 15. Rotation of the shower head 2 about the longitudinal axis 15 in relation to the shower body 11 is therefore blocked.

In the enable position, shown in FIG. 3, of the locking ring 14, in which the latter is rotated by a few degrees anticlockwise in relation to the blocking position shown in FIGS. 1 and 2, as can be seen by means of the rotational position of the operating lug 24, the four recesses 22 are aligned opposite the four latching lugs 13, and therefore the latching lugs 13 can move into the recesses 22 for removing from the latching holes 26. The locking ring 14 therefore enables release of the shower head 2 from the shower body 11. In the blocking position of the locking ring 14 that is shown in FIG. 4, the recesses 22 are displaced with respect to the latching lugs 13 in the circumferential direction along the circumference 27 of the coupling ring part 12, as a result of which the locking ring 14 blocks removing of the latching lugs 13 from the latching holes 26 of the coupling ring part 25, not shown in FIG. 4.

FIG. 5 shows a longitudinal section of the sanitary shower 1 with the shower head 2 and the shower body 11, wherein, in the longitudinal sectional view of FIG. 5 in comparison to the longitudinal sectional view of the shower head 2 of FIG. 1, the sanitary shower 1 with the shower head 2 is rotated by 45° about the longitudinal axis 15 of the coupling ring part 12. The latching lugs 13 are secured in the recesses 34 in the axial direction, in the circumferential direction and radially inwards with respect to the longitudinal axis 15 by the coupling ring part 12. The latching lugs 13 bear in each case by a rear side 31 against the inner side 21 of the locking ring 14. The locking ring 14 is in the blocking position thereof and thereby blocks removal of the latching lugs 13 from the latching holes 26. The latching lugs 13 have a curved spring shape, as a result of which, when the shower head 2 and the shower body 11 are plugged together, said latching lugs can latch inwardly in the radial direction into the latching holes 26 by latching on, i.e. the latching lugs 13 have been elastically deformed and are hooked in the latching holes 26. For this purpose, the latching lugs 13 are manufactured from a material with elastic properties, such as, for example, an elastic metal material or plastics material.

Therefore, the shower head 2 and the shower body 11 are connected to each other in a form-fitting manner in the axial direction, and the shower head 2 is secured in the axial direction against release from the shower body 11. In the opposite axial direction, a stop limitation 30 of the plug-on connector means 10 in the form of a collar on the connection part 4 limits the plugging together of the shower head 2 and of the shower body 11, with the coupling ring part 25 bearing against the stop limitation 30.

In order to plug together the shower head 2 and the shower body 11, the locking ring 14 can be in the blocking position thereof. In order to release the shower head 2 from the shower body 11, the locking ring 14 has to be in the enable position thereof, as shown in FIG. 6. The latching lugs 13 and the latching holes 26 are shaped in such a manner that, when the shower head 2 and the shower body 11 are pulled apart, the latching lugs 13 can move out of the latching holes 26 into the recesses 22, as a result of which the shower head 2 can be released from the shower body 11.

The shower body 11 or shower arm can be fastened by a fastening rear side 36 to a shower cubicle ceiling or bathroom ceiling. The plug-on connector means 10 may be referred to as rapid-action connector means, by means of which the shower head 2 can easily be attached to the shower head 11, in particular also by overhead installation, and released therefrom again.

FIG. 7 shows a further embodiment of a sanitary shower 1', wherein, for easier understanding, the same reference numbers are used not only for identical, but also functionally equivalent elements as in FIGS. 1 to 6, to the description of which reference can be made in this respect. As in the variant of FIGS. 1 to 6, a shower body 11' has a circular first coupling ring part 25', and a shower head 2' has a circular second coupling ring part 12' and a locking ring 14'. When the shower body 11' and the shower head 2 are plugged together or when the first coupling ring part 25' is inserted into the second coupling ring part 12', latching lugs 13 disposed on the second coupling ring part 12' lock in corresponding latching holes 26', located radially opposite the latter, in the first coupling ring part 25' by latching on. In the process, the latching lugs 13 and the latching holes 26' secure the shower head 2' in the axial direction against release from the shower body 11' and, in the opposite axial direction, limit the plugging together of the shower head 2' and of the shower body 11'. When the components are plugged together, a fluid outlet 37 of the shower body 11', the fluid outlet extending axially in the first coupling ring part 25', and a fluid inlet 7' of the shower head 2', the fluid inlet extending axially in the second coupling ring part 12', are fluidically connected to each other.

The variant of FIG. 7 differs from the variant of FIGS. 1 to 6 in that the locking ring 14' is movable coaxially with respect to the second coupling ring part 12' and axially relative thereto along a longitudinal axis 15' of the second coupling ring part 12'. An axial movement of the locking ring 14' in relation to the second coupling ring part 12' is limited in the axial direction by the interaction of first stop collars 38 of the second coupling ring part 12' with first stop bodies of the locking ring 14' and in the opposite axial direction by the interaction of an encircling second stop collar 40 of the second coupling ring part 12' with an encircling second stop body 41 of the locking ring 14'. Furthermore, the first stop bodies 39 are guided in associated recesses 42 of the second coupling ring part 12', and therefore the locking ring 14' is secured against rotating about the longitudinal axis 15' in relation to the second coupling ring part 12'.

In FIG. 7, a helical spring 43 of the plug-on connector means 10', the helical spring radially surrounding the second coupling ring part 12' and the second stop body 41, acts upon the locking ring 14' in the axial direction into a blocking position, wherein the first stop bodies 39 bear against the first stop collars 38. The latching lugs 13 each bear by means of a rear side 31 against an inner side 21' of the locking ring 14'. The locking ring 14' thereby blocks removing of the latching lugs 13 from the latching holes 26'.

The inner side 21' of the locking ring 14' has recesses 22' which are displaced axially with respect to the latching lugs 13 in the blocking position of the locking ring 14'. If the locking ring 14' is moved from the blocking position thereof in relation to the second coupling ring part 12' downwards in FIG. 7 counter to the restoring force of the helical spring 43 until the second stop body 41 bears against the second stop collar 40, the recesses 22' are then aligned opposite the latching lugs 13, and therefore the latching lugs 13 can move into the recesses 22' for removing from the latching holes 26'. The latching ring 14' is therefore in the enable position thereof and enables the shower head 2' to be released from the shower body 11'.

In the embodiments of FIGS. 1 to 6, the locking ring is disposed rotatably in relation to the second coupling ring part. In the embodiment of FIG. 7, the locking ring is disposed in an axially movably manner in relation to the second coupling ring part. Alternatively thereto, for example, the locking ring can be disposed in a rotatable and axially movable manner in relation to the second coupling ring part.

Furthermore, in the embodiments shown, the second coupling ring part 12, 12' surrounds the first coupling ring part 25, 25'. Alternatively thereto, the first coupling ring part can surround the second coupling ring part. In addition, in the embodiments shown, the latching lugs are arranged on the second coupling ring part. In addition or alternatively thereto, latching lugs can be attached to the first coupling ring part. In particular, the locking ring can be arranged movably in relation to the first coupling ring part.

In the embodiments of FIGS. 1 to 6, a screw as anti-twist locking element can fix the locking ring in the blocking position thereof in a manner secured against rotation. Starting from the embodiment of FIG. 7, in a similar manner, for example, an additional screw as axial locking element in the locking ring and the second coupling ring part can fix the locking ring there in the blocking position thereof in a manner secured against displacement axially. In addition, the embodiment of FIG. 7 has a helical spring which acts upon the axially movable locking ring in the axial direction into the blocking position thereof. Starting from the embodiment of FIGS. 1 to 6, in a similar manner, for example, an additional spring can act there upon the rotatable locking ring in the direction of rotation about the longitudinal axis of the second coupling ring part into the blocking position of said locking ring.

In the embodiments of FIGS. 1 to 6, the first coupling ring part is provided with four axially extending guiding ridges, and the second coupling ring part is provided with four corresponding axially extending guiding grooves. In general, the number and the arrangement of the guiding ridges and of the guiding grooves can be varied. Furthermore, in general, the number and the arrangement of latching lugs and correspondingly the number and the arrangement of latching holes, the number and the arrangement of recesses and the number and the arrangement of latching lug recesses can be varied. In addition, in general, the number and the arrangement of retaining pin openings and correspondingly the number and the arrangement of retaining pin recesses can be varied or in general the number and the arrangement of first stop bodies and correspondingly the number and the arrangement of stop body recesses can be varied.

Fluid inlets of the shower body are not shown in the figures. In general, the shower body has one or more fluid inlets and a number of fluid outlets which may correspond to the number of the shower outlets of the shower head, wherein, in general, the number of shower outlets can be varied, and wherein the fluid inlets of the shower head are fluidically connected to the fluid outlets of the shower body when the shower head and the shower body are plugged together.

As the exemplary embodiments shown and explained above make clear, the invention provides an advantageous sanitary shower which uses plug-on connector means for releasably attaching a shower head to a shower body of the sanitary shower and therefore permits a user-friendly installation of the shower head on the shower body.

The invention claimed is:

1. A sanitary shower, comprising:
a shower body including a fluid inlet and a fluid outlet,
a shower head which is removably attachable to the shower body with a fluid inlet in connection with the fluid outlet of the shower body and includes a shower outlet for providing a shower fluid jet,
a plug-on connector for removably attaching the shower head to the shower body,
wherein
the plug-on connector has at least one latching lug and corresponding latching hole in which the latching lug is lockable by latching on,
the plug-on connector includes a first coupling ring part on the shower body and a second coupling ring part on the shower head, which second coupling ring part is removably connectable to the first coupling ring part by coaxial insertion, wherein on one said coupling ring part the latching hole is provided and on the other said coupling ring part the latching lug is disposed to be snappingly movable in the radial direction for engaging and disengaging with the latching hole, and
the plug-on connector includes a locking ring which is disposed coaxially in relation to that said coupling ring part which includes the latching lug, the locking ring being rotatable while secured against axial displacement relative to that coupling ring part to move the locking ring from a blocking position to an enable position and from the enable position to the blocking position without being axially displaced, wherein the locking ring in the blocking position secures against removing of the latching lug from the latching hole and in the enable position, twisted relative to the blocking position, enables removing of the latching lug from the latching hole.

2. The sanitary shower according to claim 1, wherein a plurality of said latching lugs and a plurality of said latching holes are circumferentially distributed around the plug-on connector.

3. The sanitary shower according to claim 1, wherein the plug-on connector includes an anti-twist locking element by which the locking ring is fixable in the blocking position and secured against rotation.

4. The sanitary shower according to claim 1, wherein the locking ring has a recess on a side facing the latching lug into which recess the latching lug is movable for removing from the latching hole, when the locking ring is in the enable position, and which recess is displaced in relation to the latching lug in the circumferential direction, when the locking ring is in the blocking position.

5. The sanitary shower according to claim 1, wherein the sanitary shower is configured as an overhead shower.

6. The sanitary shower according to claim 1, wherein the one coupling ring part is provided with at least one axially extending guiding ridge and the other coupling ring part is provided with at least one axially extending guiding groove interacting with the guiding ridge.

7. A sanitary shower, comprising
a shower body including a fluid inlet and a fluid outlet,
a shower head which is removably attachable to the shower body with a fluid inlet in connection with the fluid outlet of the shower body and includes a shower outlet for providing a shower fluid jet, and
a plug-on connector for removably attaching the shower head to the shower body,
wherein
the plug-on connector has at least one latching lug and corresponding latching hole in which the latching lug is lockable by latching on,
the plug-on connector includes a first coupling ring part on the shower body and a second coupling ring part on the shower head, which second coupling ring part is removably connectable to the first coupling ring part by coaxial insertion, wherein on one coupling ring part the latching hole is provided and on the other coupling ring part the latching lug is disposed to be snappingly movable in the radial direction, and
the plug-on connector includes a locking ring which is disposed coaxially in relation to that coupling ring part which includes the latching lug, the locking ring being arranged on the shower head so as to be axially moveable while secured against rotation relative to that coupling ring part to move the locking ring from a blocking position to an enable position and from the enable position to the blocking position based only on axial movement without additional rotational movement, the locking ring being affixed to the shower head when the shower head is attached to the shower body and also when the shower head is detached from the shower body, wherein the locking ring in the blocking position secures against removing of the latching lug from the latching hole, and in the enable position axially displaced relative to the blocking position, enables removing of the latching lug from the latching hole.

8. The sanitary shower according to claim 7, wherein a plurality of said latching lugs and a plurality of said latching holes are circumferentially distributed around the plug-on connector.

9. The sanitary shower according to claim 7, wherein the plug-on connector includes an axial locking element by which the locking ring is fixable in the blocking position and secured against axial displacement.

10. The sanitary shower according to claim 7, wherein the locking ring has a recess on a side facing the latching lug into which recess the latching lug is movable for removing from the latching hole, when the locking ring is in the enable position, and which recess is displaced in relation to the latching lug in the axial direction, when the locking ring is in the blocking position.

11. The sanitary shower according to claim 7, wherein the one coupling ring part is provided with at least one axially extending guiding ridge and the other coupling ring part is provided with at least one axially extending guiding groove interacting with the guiding ridge.

12. The sanitary shower according to claim 7, wherein the sanitary shower is configured as an overhead shower.

* * * * *